Aug. 14, 1923.
T. M. McKELVY
1,465,142
INTERNAL COMBUSTION ENGINE VALVE
Filed Sept. 12, 1921     2 Sheets-Sheet 2
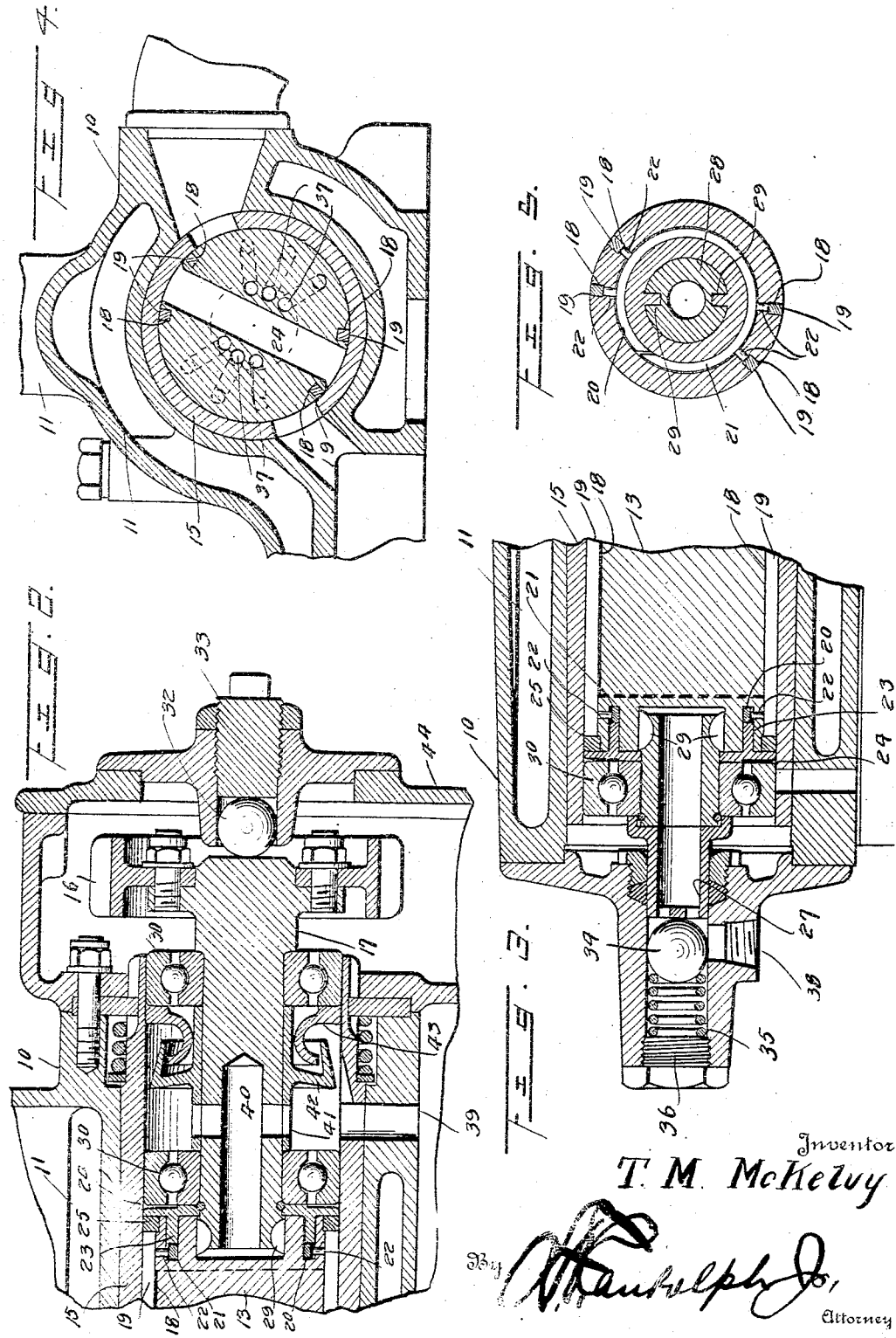
Inventor
T. M. McKelvy Patented Aug. 14, 1923.

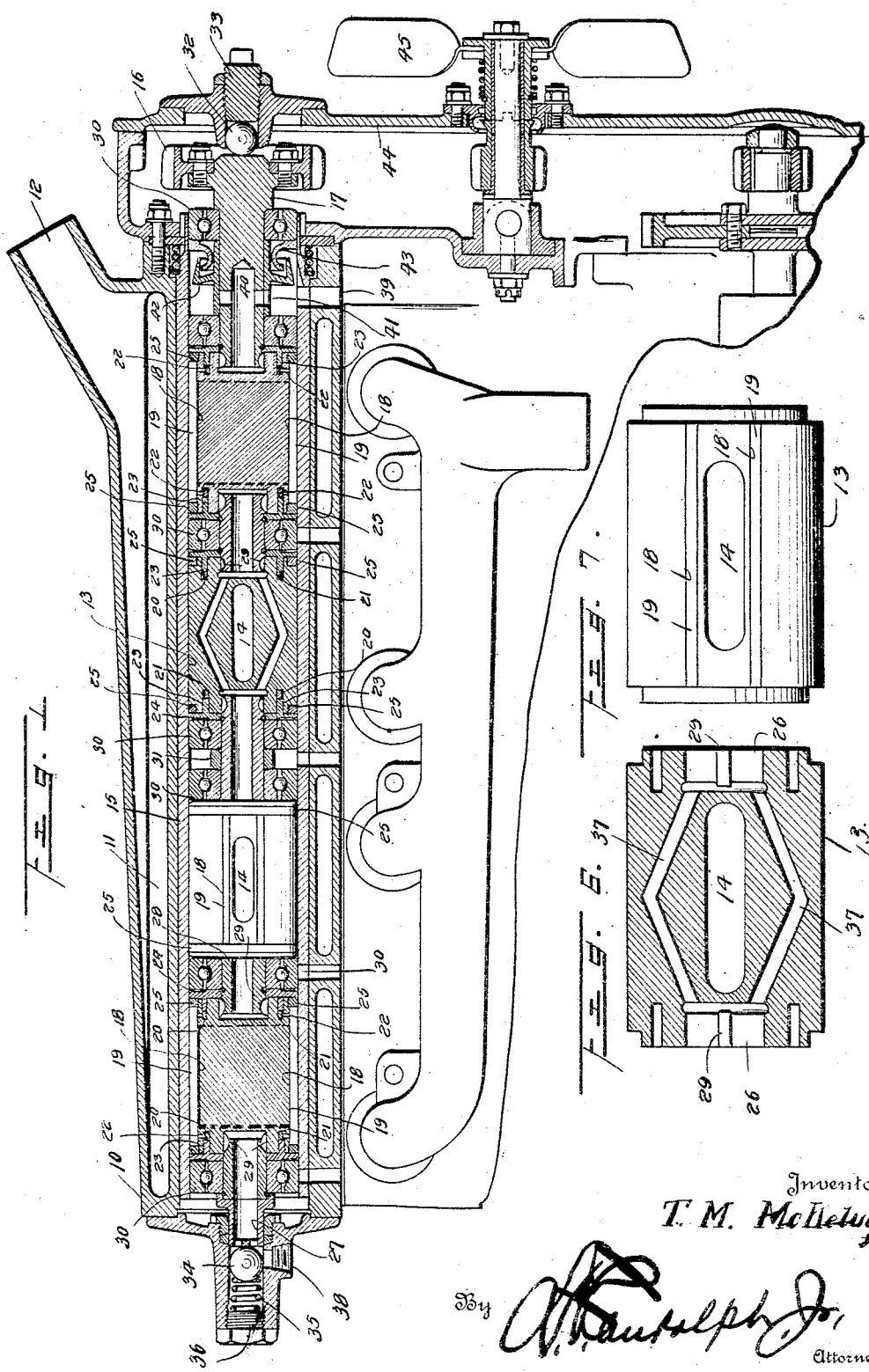

1,465,142

UNITED STATES PATENT OFFICE.

THOMAS M. McKELVY, OF FRESNO, CALIFORNIA, ASSIGNOR TO McKELVY ROTARY VALVE CO., OF FRESNO, CALIFORNIA, A CORPORATION.

INTERNAL-COMBUSTION-ENGINE VALVE.

Application filed September 12, 1921. Serial No. 500,029.

*To all whom it may concern:*

Be it known that I, THOMAS M. McKELVY, a citizen of the United States, residing at Fresno, in the county of Fresno and State of California, have invented certain new and useful Improvements in an Internal-Combustion-Engine Valve; and I do hereby declare the following to be a full, clear, and exact description of the invention, such as will enable others skilled in the art to which it appertains to make and use the same.

The object of the invention is to provide a construction of valves peculiarly adapted to internal combustion engines having a plurality of cylinders and wherein the valve consists of an assembly in a practical and durable form of a plurality of valve bodies or sections or units, corresponding in construction and adapted to be separately constructed and independently removed for repair or replacement but mutually or jointly operated and held in proper position in relation to the ports which they control and which may be efficiently lubricated throughout by means provided for a continuous circulation of oil progressing longitudinally of the series of separable bodies or sections; and in that connection to provide improved and efficient means for assembling and holding the valve bodies or sections in their proper relative position and for bodily adjusting the same and maintaining them in proper position while facilitating the dismounting or removal thereof when required for cleaning or repair; and with these objects in view the invention consists in a construction, combination and relation of parts of which a typical embodiment is illustrated in the accompanying drawing, wherein:

Figure 1 is a sectional view of a portion of an internal combustion engine provided with a valve mechanism embodying the invention.

Figures 2 and 3 are enlarged detail views respectively of opposite end portions of the valve mechanism.

Figure 4 is a transverse sectional view of the same.

Figure 5 is a detail transverse sectional view of one of the valve members.

Figure 6 is a longitudinal sectional view of one of the valve members.

Figure 7 is a side view of one of the valve members.

Within a suitable casing 10 which may be water jacketed as indicated at 11 with an outlet 12 is arranged the valve comprising in the construction illustrated a plurality of valve bodies or members 13 having the ports 14 and operating in a tapered valve sleeve 15, said valve bodies or members being secured together in series for simultaneous movement through any suitable or preferred mechanism such as that indicated by the gear 16 carried by the spindle 17 at one end of the series.

Fitted in suitable grooves or seats 18 disposed longitudinally of each valve member or section at opposite sides of the terminals of the ports 14 therein are packing strips 19 to which an outward impulse is imparted by expansion rings 20 fitted in channels 21 which are accessible from the terminals of the valve members or sections, thrust pins 22 being arranged to convey the expansive force of the rings to the said strips and being arranged in radial openings establishing communication between the seats 18 and the channels 21. These expansion rings are held in place by annular webs 23 on cap plates 24 fitted against the ends of the valve members or sections and also serving as retainers for packing rings 25 of the expansion type which are located at the extremities of the longitudinal packing strips 19.

The terminals of the valve members or sections are provided with axial cavities 26, the outer cavities of the terminal valve members being adapted for the reception respectively of the adjacent ends of the terminal spindle member 17 above described and a similar terminal spindle member 27, while between the adjacent ends of the valve members or sections in the series and terminally fitted in the cavities 26 thereof are the intermediate spindle members 28 forming coupling members between the valve members or sections and said terminal and intermediate spindle members are interlocked with the valve members or sections by means of keys or gibs 29 so that rotary motion applied to the spindle member 17 at one end of the series is conveyed throughout the series, and all of said spindle members are mounted in anti-friction bearings 30 of which one or more may be located as shown between the adjacent ends of each two members or sections of the valve with a spacing washer 31 interposed between said bearings when two are employed as will be seen at the center of the series in Figure 1.

The outer end of the terminal spindle member 17 is preferably arranged in contact with a thrust or bearing ball 32 adjustably supported by a plug 33 or its equivalent, while in contact with the corresponding outer end of the terminal spindle member 27 is arranged a similar bearing ball or anti-friction thrust member 34 held in place by a spring 35 of which the tension is adjustable by means of the plug 36. Preferably however this plug 36 is capped to occupy a fixed position, and the spring 35 is held under tension by the adjustment of the plug 33 at the opposite end of the series, to insure a proper relative arrangement of the several elements comprising the valve and insure a proper operation thereof in use.

Formed in the bodies of the valve members or section are channels or ducts 37 terminally communicating with the cavities 26 in the extremities of the members or sections, and the spindle members are hollow or tubular in form so as to establish communication between the channels or ducts of the several valve members or sections, and in communication with the terminal spindle members 27 and formed in the casing of the valve is an oil supply port 38 with which may be connected an oil supply tube or pipe (not shown) by means of which lubricating oil may be supplied to the valve under pressure and therefore adapt it to circulate throughout the entire series of elements comprising the valve to an outlet 39 at the opposite end of the series from which the surplus may be conveyed back to the source of supply or disposed of otherwise as may be preferred, the hollow portion 40 of the spindle members 17 being provided with lateral ports 41 to permit of the escape of the oil to the outlet 39. Adjacent to the ports 41 are complemental baffling rings 42 and 43 of which the former is carried by the terminal spindle member 17 and the latter by the casing and which serve to protect the terminal anti-friction bearing 30 of said spindle member 17 against undue pressure of the oil which would cause leakage into the housing 44 which is preferably employed for the gearing by which the valve is actuated and which also as shown may be utilized to support the ventilating fan mechanism indicated at 45.

In this way the oil by which the valve is lubricated is kept out of the crank casing and separate from the oil in the latter and may be returned to the tank for repeated use in the valve, under pressure if desired.

Having thus described the invention, what I claim is:—

1. A valve for internal combustion engines consisting of a plurality of members or sections of ported construction arranged in coaxial alignment and terminal and intermediate spindle members having terminal interlocking connection with said valve members or sections, the spindle members being of tubular construction and the valve members or sections being provided with channels or ducts in communication with the bores of said spindle members to establish a continuous lubricating conductor throughout the series.

2. A valve for internal combustion engines consisting of a plurality of members or sections of ported construction arranged in coaxial alignment and terminal and intermediate spindle members having terminal interlocking connection with said valve members or sections, the spindle members being of tubular construction and the valve members or sections being provided with channels or ducts in communication with the bores of said spindle members to establish a continuous lubricating conductor throughout the series, means being provided for introducing and discharging lubricating oil at the extremities respectively of the series.

3. A valve having a plurality of valve members, a spindle therefor and spanning the same and said valve members and spindle having communicating lubricant passageways.

4. A valve consisting of a plurality of valve members, said members having cavities in adjacent ends thereof having a lubricant groove, a spindle extending into said cavities, and said valves having lubricant grooves intermediate their axis and peripheries and in communication with said groove and the cavities.

5. A valve consisting of valve means, spindle means therefor, adapted for passage of lubricant along the same, and baffle means associated with said spindle means to counteract the pressure of the lubricant and prevent escape thereof longitudinally of the spindle means.

6. A valve for internal combustion engine having a port therethrough and a channel in an end wall thereof, packing strips arranged on opposite sides of said port, an expansion ring in said channel, thrust pins extending from said expansion ring and engaging said packing strip, a cap plate having a web extending into said channel and abutting said expansion ring and a packing ring surrounding the valve and overlapped by said cap plate.

7. A rotary valve for internal combustion engines comprising a spindle having a lubricant passage therethrough, ported valve members associated with the spindle in relatively spaced relation and provided with lubricant passages communicating with the passage of the spindle, and bearing means for the spindle between the valve members.

8. A rotary valve for internal combustion engines having spaced valve members, a spindle for the valve members, the valve members each having a lubricant passageway, the spindle means having a lubricant passageway communicating with said passageways and bearing means for the spindle means.

In testimony whereof I affix my signature in presence of two witnesses.

THOMAS M. McKELVY.

Witnesses:
A. R. JACK,
WALTER SHOEMAKER.